(12) United States Patent
Zhou

(10) Patent No.: US 9,518,582 B2
(45) Date of Patent: Dec. 13, 2016

(54) MOTOR SPACER, MOTOR SPACER APPLIED TO VARIABLE-SPEED COMPRESSOR AND COMPRESSOR

(71) Applicant: Danfoss (Tianjin) Ltd., Tianjin (CN)

(72) Inventor: Xueyou Zhou, Tianjin (CN)

(73) Assignee: Danfoss (Tianjin) Ltd., Tianjin (CN)

( * ) Notice: Subject to any disclaimer, the term of this patent is extended or adjusted under 35 U.S.C. 154(b) by 420 days.

(21) Appl. No.: 14/093,571

(22) Filed: Dec. 2, 2013

(65) Prior Publication Data
US 2014/0154110 A1   Jun. 5, 2014

(30) Foreign Application Priority Data

Dec. 3, 2012 (CN) ...................... 2012 2 0655138 U

(51) Int. Cl.
| | |
|---|---|
| F04C 23/02 | (2006.01) |
| H02K 1/14 | (2006.01) |
| H02K 1/18 | (2006.01) |
| F01C 21/10 | (2006.01) |
| F04C 23/00 | (2006.01) |
| H02K 1/30 | (2006.01) |
| H02K 9/22 | (2006.01) |
| F04C 18/02 | (2006.01) |

(52) U.S. Cl.
CPC .............. *F04C 23/02* (2013.01); *F01C 21/10* (2013.01); *F04C 23/008* (2013.01); *H02K 1/145* (2013.01); *H02K 1/185* (2013.01); *F04C 18/0215* (2013.01); *F04C 2240/80* (2013.01); *H02K 1/30* (2013.01); *H02K 9/22* (2013.01)

(58) Field of Classification Search
CPC ... F01C 21/10; F04C 18/0215; F04C 2240/80; F04C 23/008; F04C 23/02; H02K 1/145; H02K 1/185; H02K 1/18; H02K 1/182; H02K 1/30
USPC .......................... 310/216.135, 54, 216.049, 216.055,310/216.113, 58, 59, 64, 91, 89; 417/366, 371, 417/410.5; 418/55.1–55.6
See application file for complete search history.

(56) References Cited

U.S. PATENT DOCUMENTS

| | | | | |
|---|---|---|---|---|
| 2,473,904 | A * | 6/1949 | Rataiczak | F25B 31/02 29/897 |
| 4,134,036 | A * | 1/1979 | Curtiss | H02K 1/185 174/DIG. 19 |
| 4,837,468 | A * | 6/1989 | Froment | H02K 1/185 29/596 |
| 5,401,146 | A * | 3/1995 | Moriya | F04D 29/167 403/338 |
| 5,873,710 | A * | 2/1999 | Tucker | F04C 23/008 310/89 |

(Continued)

*Primary Examiner* — Dominick L Plakkoottam
(74) *Attorney, Agent, or Firm* — Carlson, Gaskey & Olds, PC

(57) ABSTRACT

A motor spacer for a variable-speed compressor positions and supports a stator of a motor in a cylindrical section of a compressor shell. The spacer includes a ring member and a plurality of support blocks. The ring member is coaxially mounted around the stator by a clamping force. Each support block protrudes radially and outwardly from the ring member and has a hollow frame structure with a closed enclosure. Each support block has a support surface in contact with the shell. Each support surface is located on a side of an imaginary ring cylinder having a common axis with the ring member. The plurality of the support blocks are adapted to mount the motor spacer onto an inner side of the shell by a clamping force.

18 Claims, 4 Drawing Sheets

(56) References Cited

U.S. PATENT DOCUMENTS

| | | | | |
|---|---|---|---|---|
| 8,246,322 B2* | 8/2012 | Genevois | ............... | H02K 1/185 |
| | | | | 310/216.049 |
| 2009/0035160 A1* | 2/2009 | Yoo | ......................... | F04C 2/102 |
| | | | | 417/372 |
| 2011/0129377 A1* | 6/2011 | Huang | ................... | F01C 21/007 |
| | | | | 418/55.1 |
| 2011/0135523 A1* | 6/2011 | Williams | ............... | F04C 23/008 |
| | | | | 418/55.4 |
| 2013/0251543 A1* | 9/2013 | Duppert | ................ | F04C 23/008 |
| | | | | 417/53 |
| 2013/0251551 A1* | 9/2013 | Bessel | .................... | F04B 35/04 |
| | | | | 417/321 |

* cited by examiner

MOTOR SPACER, MOTOR SPACER APPLIED TO VARIABLE-SPEED COMPRESSOR AND COMPRESSOR

RELATED APPLICATION

This application claims priority of Chinese Patent Application No. 201220655138.1, filed on Dec. 3, 2012. The disclosure of the above application is incorporated herein by reference.

TECHNICAL FIELD

The present invention relates to the field of compressors, and more particularly to a motor spacer, a motor spacer to be applied to a variable-speed compressor and a compressor.

BACKGROUND

Conventional, a compressor includes a hermetic space defined by a shell, and the shell is provided with an inlet hole and an outlet hole for refrigerant. The hermetic space in the compressor may be divided into a suction volume and a compression volume, which are isolated by an internal member of the compressor and are respectively located at two ends of the hermetic space.

Generally, the compressor includes a motor. The motor is disposed in the suction volume, and at least includes a stator and a rotor. The stator is located at an outer side of the motor, and is fixedly mounted relative to the shell. The rotor is disposed at a central position of the motor, and is rigidly connected to a drive shaft of the compressor.

A motor spacer is provided to fix the stator of the motor to the shell of the compressor. The motor spacer includes a ring element pressed onto an outer surface of the stator. Multiple fixing elements are integrally formed with the ring element, and protrude from the ring element outwardly and radially. During assembly of the compressor, the shell of the compressor is press fit onto the stator with the motor spacer, so that the radially outer surface of the protrusions of the motor spacer is in contact with an inner surface of the shell.

However, nature frequency of the conventional motor spacer has resonance with electromagnetic frequency of a motor of a compressor (especially variable-speed compressor) to some extent. Therefore, the conventional motor spacer cannot meet noise and vibration requirements for the compressor.

SUMMARY

In view of the above, one aspect of the present invention provides a motor spacer, which can position and support a stator of a motor in a cylindrical portion of a compressor shell.

An aspect of the present invention provides a motor spacer, applicable for positioning and supporting a stator of a motor in a cylindrical section of a compressor shell. The motor spacer includes a ring member and a plurality of support blocks. The ring member is coaxially mounted around the stator by a clamping force.

Each support block protrudes radially and outwardly from the ring member and has a hollow frame structure with a closed enclosure. Each support block has a support surface in contact with the shell, and the support surface is located on a side of an imaginary ring cylinder having a common axis with the ring member. The plurality of support blocks are adapted to mount the motor spacer onto an inner side of the shell by a clamping force.

Another aspect of the present invention, the above motor spacer is applied to a variable-speed compressor.

Another aspect of the present invention provides a compressor including a shell, at least one portion of which is a cylindrical portion. A substantially hermetic space is defined by the shell. A motor is mounted onto an inner side of the cylindrical portion of the shell. The motor comprises a stator. The motor spacer described above may be coaxially mounted around the stator and mounted onto an inner side of the shell by a clamping force.

Compared with the conventional art, the motor spacer can fix the stator to a shell of the compressor at a correct position, can meet some performance requirements of the compressor such as noise and vibration requirements, and can facilitate casting and machining processes. The hollow frame with a closed enclosure can change the natural frequency of the motor space, which reduces noise and a vibration level of a compressor with the motor spacer.

BRIEF DESCRIPTION OF THE DRAWINGS

These and/or other aspects and advantages of the present invention will be clearer and more comprehensible in the following descriptions of embodiments with reference to the following drawings.

DETAILED DESCRIPTION

The technical solution of the present invention will be described hereinafter in detail with reference to embodiments and FIGS. 1-5. In the specification, the same or similar reference signs represent the same or similar components. The following description about the embodiments of the present invention with reference to the accompanying drawings aims to explain the general inventive concept of the present invention, but should not be construed as a limitation to the scope of the present invention.

Figure 1:
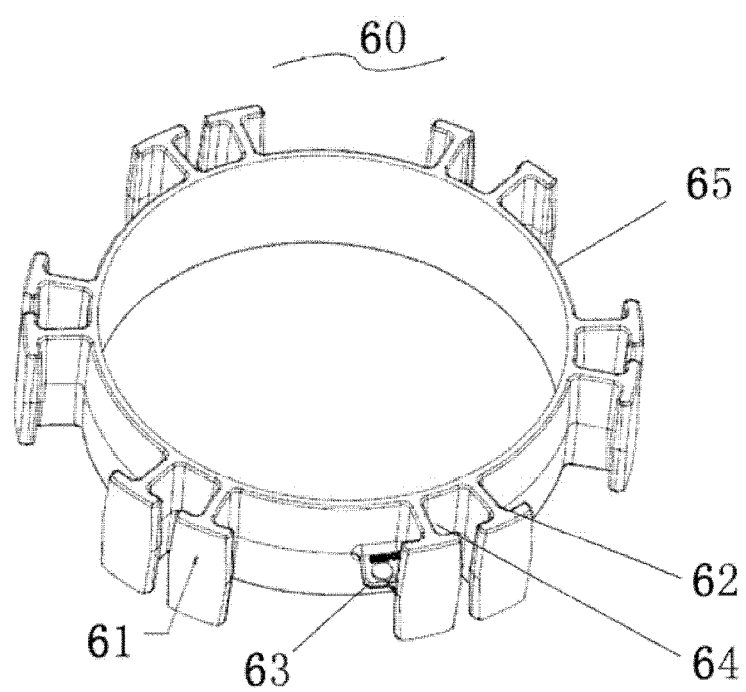
FIG. 1 is a schematic diagram of a conventional motor spacer for a compressor.

FIG. 1 is a schematic diagram of a conventional motor spacer for a compressor. Specifically, the motor spacer 60 includes a ring member 65 and multiple support members 62 projecting radially and outwardly from the ring member 65. The ring member 65 has a substantially cylindrical shape. Each of the support members 62 has support surfaces 61, and is in contact with the inner surface of the compressor shell to support the motor spacer 60 on the compressor shell. All the support surfaces 61 are located on a side of an imaginary ring cylinder having a same axis as the ring member 65. In FIG. 1, the number of the support surfaces 61 is set to twelve. The twelve support surfaces 61 are evenly divided into 6 groups and are assembled with a middle shell of the compressor. Each of the support members 62 has one group of support surfaces 61, and a frame structure with thin walls and openings on its periphery. The ring member 65 is further provided with a sign-ear 63, used for roughly positioning a circumferential position of the motor spacer when assembling the motor spacer onto the middle shell of the compressor. Each of the support members 62 has a casting slope 64 used for making the casting process easier.

However, the nature frequency of the motor spacer 60 shown in FIG. 1 resonates with the electromagnetic frequency of the motor of the compressor to some extent, thereby generating larger noise and vibration.

In view of the above, the following embodiments provide a motor spacer, which can reduce noise and vibration.

Figure 2:
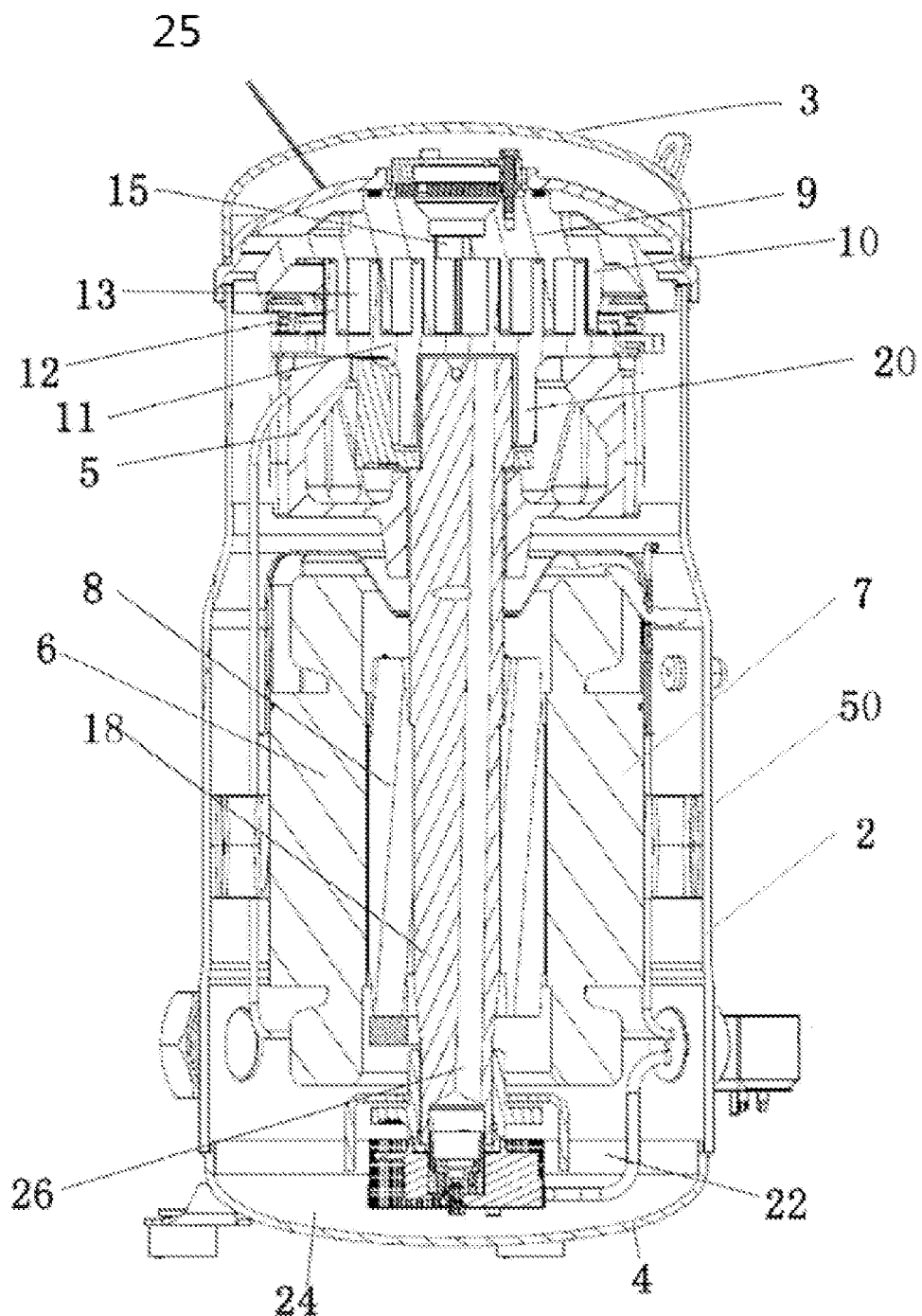
FIG. 2 is a schematic diagram of a compressor provided with a motor spacer according to an embodiment of the present invention.

FIG. 2 shows a scroll compressor at a vertical position. The scroll compressor includes a hermetic space defined by a middle shell 2, and an upper end and a lower end of the middle shell 2 are enclosed by a cover 3 and a base 4 respectively. The middle portion of the compressor is provided with a housing 5. A separator plate 25 defines two volumes. One is a suction volume located below the separator plate 25 and the other is a compression volume located above the separator plate 25.

The scroll compressor further includes a motor 6 including a stator 7 with an outer diameter D7. A rotor 8 is disposed at the center of the motor 6.

The housing 5 is used for mounting a gas compression mechanism. The compression mechanism includes a fixed scroll including a fixed scroll body 9 assembled with a fixed scroll wrap 10 facing downwards. An orbiting scroll includes an orbiting scroll body 11 assembled with an orbiting scroll wrap 12 facing upwards. The two scroll wraps 10 and 12 of the fixed scroll and the orbiting scroll are fitted to each other, thereby forming a compression chamber 13 with a variable volume.

Gas, such as refrigerant, is supplied through an inlet pipe, and the inlet pipe is in connection to an upper portion of the suction volume of the compressor through an inlet hole formed in the shell 2. The compressed gas escapes from the center of the scroll body to a chamber through an opening 15. The gas is discharged then discharged from the chamber through an outlet hole formed in the cover 3. The outlet hole is connected to an outlet pipe.

To fix the rotor 8, an upper end of a central axis 18 deviates from the center to form a crank shaft. The upper end of the central axis 18 is fitted with a sleeve-like portion 20 of the orbiting scroll body 11. When the axis 18 is driven by the motor 6 to rotate, the axis 18 drives the orbiting scroll body 11, and guides, by means of a connection element, the orbiting scroll body 11 to orbit relative to the fixed scroll body 9.

The axis 18 may be guided to move relative to other portions by means of a lower bearing formed in an alignment part 22 fixed onto the shell 2 and by means of an upper bearing formed in the housing 5. The base 4 defines a shell 24, and the shell 24 includes an oil sump. An end portion of an inlet pipe of a pump is located in the oil sump, and the pump supplies lubrication oil to various bearings by means of a channel 26 inclined with respect to an axis of the shaft.

The motor 6 is not fixed to the housing 5, but is fixed onto the shell 2 at the cylindrical portion of the shell 2 through the motor spacer 50. An inner diameter of the cylindrical portion of the shell 2 is larger than an outer diameter of the stator 7. In an example, the motor spacer 50 may be made of metals such as aluminum by molding, and then may be machined to a predetermined axial height by extrusion and/or cutting.

It can be understood that, although FIG. 2 takes the scroll compressor as an example for description, the motor spacer in the embodiment of the present invention also can be used in other types of compressors.

Figure 3:
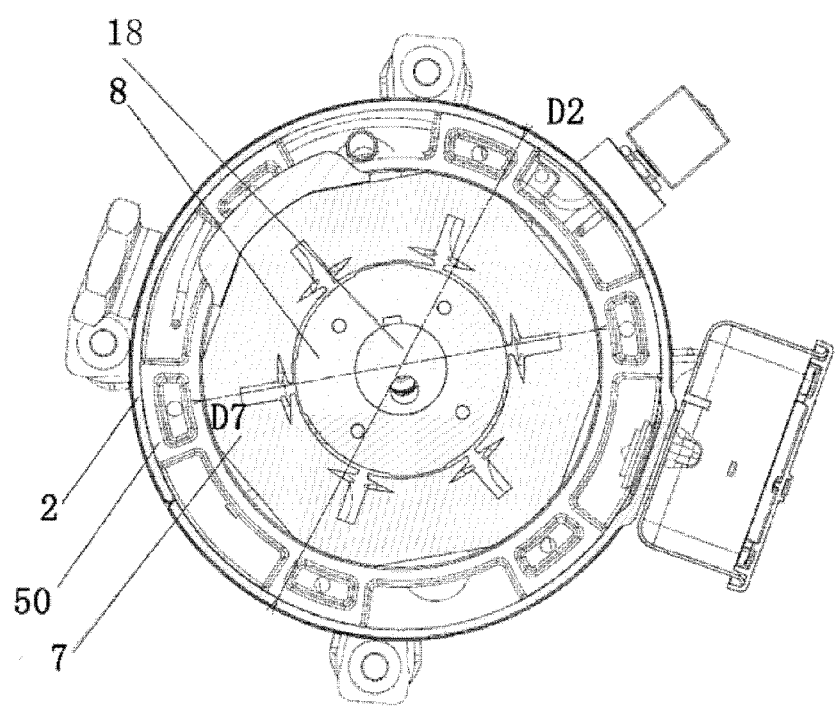
FIG. 3 is a sectional view of an assembly between a motor spacer and a shell of a compressor when the motor spacer is mounted in the compressor.
Figures 4, 5:
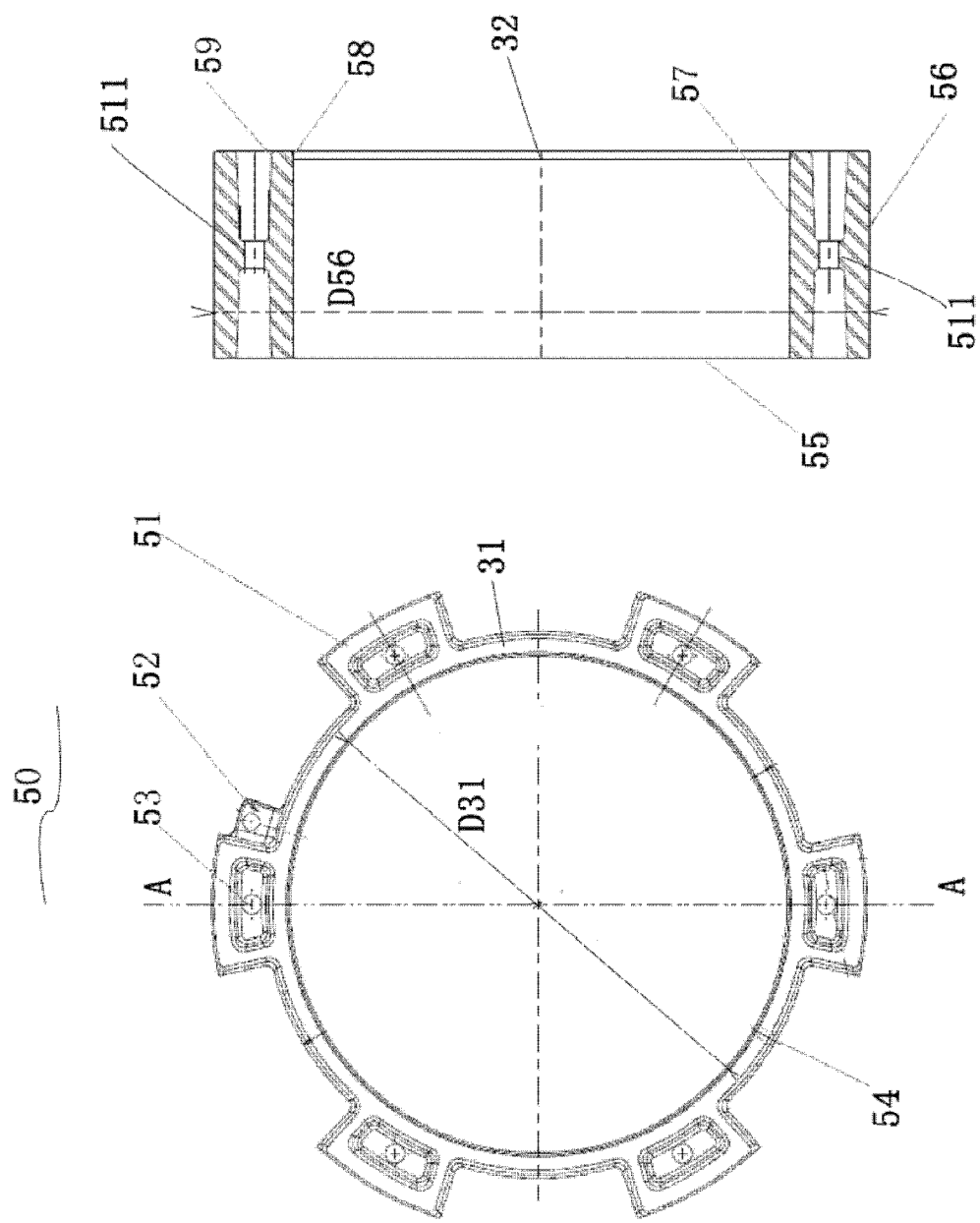
FIG. 4 is a schematic diagram of a motor spacer according to an embodiment of the present invention.
FIG. 5 is a sectional view of the motor spacer which is cut along line A-A in FIG. 4.

Specifically, FIG. 4 and FIG. 5 describe in detail the structure of the motor spacer 50 according to embodiments of the present invention and FIG. 3 illustrates an exemplary assembly between the motor spacer 50 and other components when the motor spacer is mounted in the compressor. It can be understood that, the motor spacer 50 in this embodiment can be used in various compressors to reduce noise and vibration thereof. A variable-speed compressor is hereinafter taken as an example for description.

As shown in FIG. 3 and FIG. 4, the motor spacer 50 for a variable-speed compressor positions and supports a stator 7 of a motor with an outer diameter D7 in a cylindrical portion (which, in this embodiment, is the middle of the compressor, called a middle shell) of a compressor shell 2. An inner diameter D2 of the compressor shell 2 is larger than the outer diameter D7 of the stator 7. The motor spacer 50 includes a ring member 31 having a substantially constant thickness and multiple one-piece (or integrated) support blocks 51. An inner diameter D31 of the ring member 31 is substantially equal to the outer diameter D7 of the stator 7, and the ring member 31 is substantially coaxially mounted around the stator 7 by a clamping force. In an example, the ring member 31 may have a cylindrical shape. The multiple one-piece support blocks 51 project radially and outwardly from the ring member 31. Each of the support blocks 51 has a support surface 56 in contact with the inner surface of the shell 2 to support the motor onto the shell 2. The support surface 56 is located on an inner surface of an imaginary cylinder having an axis 32 the same as the ring member 31. A diameter D56 of the imaginary cylinder is substantially equal to the inner diameter D2 of the shell 2. The motor spacer 50 is mounted on an inner side of the shell 2 by a clamping force. It should be noted that, it is assumed herein that the imaginary cylinder is formed by support surfaces 56 and a virtual extending surface connecting two adjacent support surfaces.

In this embodiment, the number of the support blocks 51 is 6. However, the number of the support blocks 51 may be set to at least 3 as long as the motor spacer 50 can support the motor to the compressor shell.

FIG. 3 shows a sectional view of the motor spacer 50 when the motor spacer 50 is mounted on the middle shell 2. Specifically, for sake of clarity, only components inside the middle shell 2 are shown. Therefore, compressor components outside the middle shell 2 (such as a compressor bracket, a base plate, or an electrical box) are not described or identified as they have no direct interaction with the motor spacer 50. In FIG. 3, the motor spacer 50 supports the stator 7 onto the middle shell 2 vertically along the circumferential direction of the middle shell 2. The rotor 8 is rotatably set in the stator 7 and there is an air gap between the rotor 8 and the stator 7.

As shown in FIG. 5, in an embodiment, a support block 51 has a frame structure with a reinforced rib 511, and thickened walls. It can be seen from FIG. 5 that, the reinforced rib 511 may be located around a through hole 53 of the support block 51.

The frame structure of the support block 51 is one-piece or integral, or a cross section of the support block 51 is in a closed shape, such as a substantially rectangular or oval shape. In other words, the support block 51 has a hollow frame structure with closed enclosure. The integral frame structure of the support block 51 (in other words, the hollow frame with closed enclosure) can change the nature frequency of the motor spacer, and reduce the noise and vibration of the compressor with such motor spacer.

In an embodiment, the thickness of the walls of the support block 51 is larger than the thickness of the walls of the conventional positioning and supporting elements for a motor. Specifically, the support block 51 has a reinforced rib 511 and/or thickened walls can further change the nature frequency of the motor spacer and thereby can further reduce the noise and vibration of the compressor with such motor spacer.

In addition, the motor spacer 50 in this embodiment may further include a sign-ear 52 and at least one threaded hole 54. The sign-ear 52 is connected to one side of at least one support block 51, and is used for checking a substantial circumferential position of the motor spacer 50 on the middle shell 2 during assembly. In this embodiment, only one side of one support block 51 is provided with the sign-ear 52, but it is not limited to only one. The threaded hole 54 is disposed on a circumference of the ring member 31, and is used for connecting the motor spacer 50 and the stator 7 by screw.

The support block 51 in this embodiment may further be optionally provided with a through hole 53, a casting surface 55, a support surface 56, a machined inner surface 57, a chamfer 58 and a casting slope 59.

In an embodiment, each of the support blocks 51 is provided with one through hole 53 at its center, to enable dropping of the lubrication oil. The casting surface 55 is used for determining a substantially vertical position of the motor spacer 50 on the stator 7 when assembling the stator 7 and the motor spacer 50. The support surface 56 is a precisely-machined outer surface connecting the motor spacer 50 and the stator 7 to the middle shell 2 by interference fit.

The machined inner surface 57 is used for connecting the motor spacer 50 and the stator 7. The machined chamfer 58 is disposed at an outer periphery on an inner surface of the ring member 31 to make assembly of the motor spacer 50 on the stator 7 easier.

The casting slope 59 is disposed at the center of the support block 51 and communicates with the through hole 53, in order to facilitate a casting process.

As can be seen from the above embodiments, the nature frequency and rigidity of the motor spacer can be changed, and the can thus the noise and vibration level of the compressor with such motor spacer can thus be reduced.

Compared with the conventional art, the motor spacer of the variable-speed compressor has the following features: a hole (that is, the through hole 53) formed in reinforced walls or the reinforced ribs 511 at the axial center of the hollow section to allow oil to flow. The reinforced walls or reinforced ribs 511 increase the radial rigidity of the spacer, and ensure sufficient support pressure between the spacer, the shell and the stator. As such, the radial outer surface of the support blocks and the radial inner surface 57 of the ring member 31 are machined with small tolerance.

Other surfaces of the ring member 31 and the support blocks 51 have a slightly conical shape (refer to FIG. 5), which facilitates manufacturing the motor spacer 50 through a molding process. The wall of the motor spacer 50 has a maximum thickness at the radial center of the wall, and the wall of the motor spacer 50 has a division line for a molding tool in the reinforced sections of the wall.

The motor or the motor spacer 50 supports the stator 1 to the middle shell 2 at a right vertical position and along a right circumferential position of the middle shell 2. This can ensure that the stator 7 and the rotor 8 are at right positions along a vertical direction, that the stator 6 is at a right position of the middle shell 2, and that the stator 1 and the rotor 4 have an appropriate air gap.

The motor spacer 50 of the present invention can fix the stator onto a middle shell at a right position, meet performance requirements of the compressor, such as acoustic and vibration requirements, and facilitate casting and machining processes.

Although some embodiments of the general concept of the present invention have been displayed and described, a person of ordinary skill in the art should understand that, changes can be made to these embodiments without departing from the principle and spirit of the general inventive concept of the present invention, and the scope of the present invention is defined by the claims and their equivalents.

The invention claimed is:

1. A motor spacer, applicable for positioning and supporting a stator of a motor in a cylindrical section of a compressor shell, wherein the motor spacer comprises:
   a ring member to be coaxially mounted around the stator by a first clamping force;
   a plurality of support blocks, wherein each support block protrudes radially and outwardly from the ring member and has a hollow frame structure with a closed enclosure, and wherein each support block has a support surface to be in contact with the shell, and wherein the support surface is located on a side of an imaginary ring cylinder having a common axis with the ring member, and wherein the plurality of the support blocks are adapted to mount the motor spacer onto an inner side of the shell by a second clamping force; and
   a reinforcing rib extending across said hollow frame structure of said support block, and a through hole provided at a center of each of said support blocks, and extending through said reinforcing rib.

2. The motor spacer according to claim 1, wherein the support block has at least one of a reinforced frame structure and a thickened wall.

3. The motor spacer according to claim 1, wherein the motor spacer further comprises a sign-ear connected to one side of at least one support block.

4. The motor spacer according to claim 1, wherein the motor spacer further comprises at least one threaded hole disposed on a circumference of the ring member and adapted to connect the motor spacer and the stator by screw.

5. The motor spacer according to claim 4, wherein the motor spacer further comprises a casting surface adapted to confirm an approximate vertical position of the motor spacer on the stator when assembling the stator and the motor spacer.

6. The motor spacer according to claim 5, wherein the support surface is a machined outer surface adapted to connect the motor spacer and the stator to the shell by interference fitting.

7. The motor spacer according to claim 6, wherein the motor spacer further comprises a machined inner surface used for connecting the motor spacer and the stator.

8. The motor spacer according to claim 7, wherein the motor spacer further comprises a machined chamfer disposed at an outer periphery on an inner side of the ring member and adapted to facilitate assembling the motor spacer onto the stator.

9. The motor spacer according to claim 8, wherein the motor spacer further comprises a casting slope, disposed at the center of said support blocks and in connection with the through hole, used for a casting process.

10. The motor spacer according to claim 1, wherein there are six support blocks.

11. The motor spacer according to claim 1, wherein an inner diameter of the compressor shell is larger than an outer diameter of the stator, an inner diameter of the ring member is equal to the outer diameter of the stator, and a diameter of the imaginary ring cylinder is equal to the inner diameter of the compressor shell.

12. A motor spacer applied to a variable-speed compressor, wherein the motor spacer is the motor spacer recited in claim 1.

13. A compressor, comprising:
- a shell, at least one portion of which is a cylindrical portion;
- a substantially hermetic space defined by the shell;
- a motor mounted onto an inner side of the cylindrical portion of the shell, the motor comprising a stator; and
- a motor spacer coaxially mounted around the stator and mounted onto an inner side of the shell by a clamping force, the motor spacer including a ring member, coaxially mounted around the stator by a first clamping force;
- a plurality of support blocks, wherein each support block protrudes radially and outwardly from the ring member and has a hollow frame structure with a closed enclosure, and wherein each support block has a support surface in contact with the shell, and wherein the support surface is located on a side of an imaginary ring cylinder having a common axis with the ring member, and wherein the plurality of the support blocks are adapted to mount the motor spacer onto an inner side of the shell by a second clamping force; and
- a reinforcing rib extending across said hollow frame structure of said support block, and a through hole provided at a center of each of said support blocks, and extending through said reinforcing rib.

14. The compressor according to claim 13, wherein the support block has at least one reinforced frame structure and a thickened wall.

15. The compressor according to claim 13, wherein the motor spacer further comprises at least one threaded hole disposed on a circumference of the ring member and adapted to connect the motor spacer and the stator by screw.

16. The compressor according to claim 13, wherein the motor spacer further comprises a casting surface adapted to confirm an approximate vertical position of the motor spacer on the stator when assembling the stator and the motor spacer.

17. The compressor according to claim 16, wherein the motor spacer further comprises a machined chamfer disposed at an outer periphery on an inner side of the ring member and adapted to facilitate assembling the motor spacer onto the stator.

18. The compressor according to claim 17, wherein the motor spacer further comprises a casting slope, disposed at the center of the support block and in connection with the through hole, used for a casting process.

* * * * *